United States Patent [19]
Steiner

[11] Patent Number: 5,839,860
[45] Date of Patent: Nov. 24, 1998

[54] INTERTIALLY ACTIVATED SPOTFACING AND COUNTERBORING TOOL

[75] Inventor: Rudolph Steiner, Fairport, N.Y.

[73] Assignee: R. Steiner Technolgoies, Inc., Fairport, N.Y.

[21] Appl. No.: 775,576

[22] Filed: Dec. 31, 1996

[51] Int. Cl.⁶ .................................................. B23B 51/00
[52] U.S. Cl. ........................ 408/180; 408/187; 408/236; 408/73
[58] Field of Search .................................. 408/180, 159, 408/147, 148, 150, 73, 187, 236

[56] References Cited

U.S. PATENT DOCUMENTS

| | | | |
|---|---|---|---|
| 3,814,535 | 6/1974 | Steiner | 408/73 |
| 5,507,606 | 4/1996 | Steiner | 408/187 X |

FOREIGN PATENT DOCUMENTS

| | | | |
|---|---|---|---|
| 0102610 | 6/1983 | Japan | 408/150 |
| 510321 | 6/1976 | U.S.S.R. | 408/150 |

*Primary Examiner*—Andrea L. Pitts
*Assistant Examiner*—Henry W. H. Tsai
*Attorney, Agent, or Firm*—Shlesinger, Fitzsimmons & Shlesinger

[57] ABSTRACT

A cylindrical tool holder has at one end a shank section disposed to be chucked in the drive spindle of a drill press or the like, and has in its opposite end a recess in which a tool bit pivots between an operative position in which it projects radially outwardly from the recess, and in inoperative position within the recess. The bit is connected to one end of an operating rod which is pivotal in a slot in the holder, so that when the rod is swung to one limit position the tool bit is swung to its operative position, and vice versa. An actuating disc which is mounted on the holder for limited rotation relative thereto, is frictionally coupled adjacent its outer periphery with a flywheel which is rotatably mounted on the tool holder, whereby rotation may be transmitted by the holder through the flywheel and friction coupling to the actuating disc. The actuating disc has thereon two spaced pins. One pin engages a lateral projection on the operating rod to pivot the rod to its tool bit actuating position, when the actuating disc is rotated in one direction by the flywheel, and the other pin engages the projection to swing the rod to its tool bit retracting position, when the flywheel rotates the disc in the opposite direction.

12 Claims, 2 Drawing Sheets

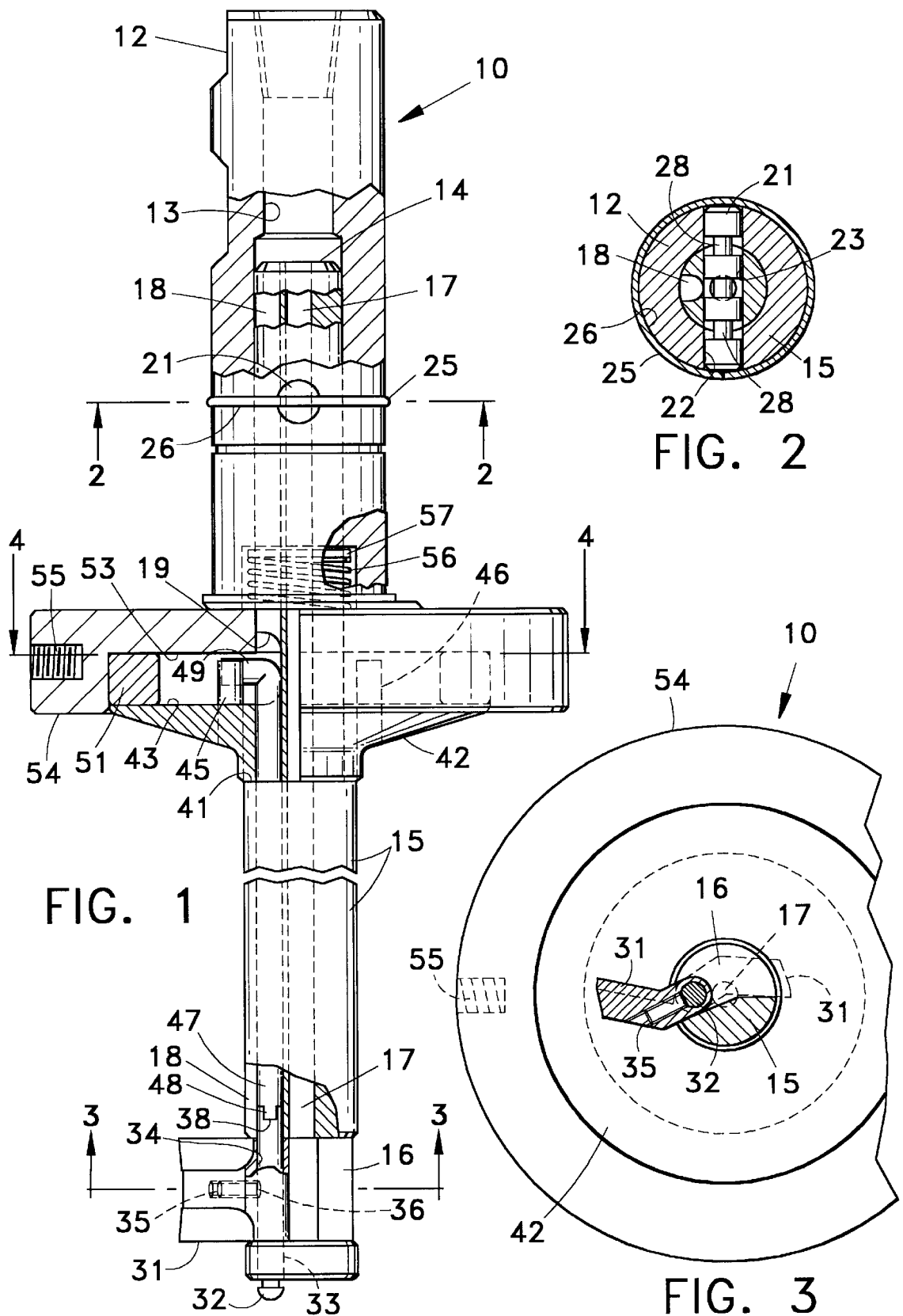

5,839,860

INTERTIALLY ACTIVATED SPOTFACING AND COUNTERBORING TOOL

BACKGROUND OF THE INVENTION

This invention relates to cutting tools, and more particularly to retractable spotfacing or counterboring tools. Even more particularly this invention relates to an improved tool of the type described having inertially operated means for actuating a retractable tool bit.

In my U.S. Pat. No. 3,814,535, I disclosed a retractable spotfacing or counterboring tool having a retractable tool bit which is pivotal between an inoperative position in which it is disposed within a slot or recess in the cutting end of the tool, and an extended or operative position in which it projects radially from the cutting end of the tool for engagement with the workpiece that is to be spotfaced or counterbored. This type of tool is particularly suitable for use in back spotfacing or counterboring such as in those cases where the surface that is to be spotfaced is relatively inaccessible by conventional, fixed, counterboring or spotfacing tool bits.

The tool disclosed in my above-noted U.S. patent was designed to carry a retractable tool bit which in use is passed through a bore in a workpiece, while the bit is retracted, and to such an extent that a clutch mechanism on the tool holder causes the bit to be advanced radially outwardly to an operative position. Thereafter the holder is retracted to engage the now-activated tool bit with the surface of the work that is to be counterbored or spotfaced. After the spotfacing or counterboring operation has been completed the rotation of the tool holder is reversed, and the tool is swung back to its retracted position so that the tool holder can then be withdrawn from the bore in the work.

While tools with a retractable tool bit of the type noted above have been extremely suitable for most machining operations, in more recent years the computer control CNC type machines have enabled automatic operations to take place at very high speeds, and have required reduction in the overall size of various tools.

It is an object of this invention, therefore, to provide an improved spotfacing or counterboring tool of the type having a retractable tool bit, which is designed to be operated at substantially greater speeds than prior such tools, and also which can be made substantially smaller than prior such tools.

A further object of this invention is to provide an improved back spotfacing and counterboring tool of the type described which utilizes a novel intertial connection between the tool bit and tool bit holder in order to effect movement of the associated tool bit into and out of its operative position.

A more specific object of this invention is to provide an improved tool of the type described which utilizes a flywheel on the tool for effecting movement of the associated tool bit to and from its operative position.

Other objects of this invention will be apparent hereinafter from the specification and from the recital of the appended claims, particularly when read in conjunction with the accompanying drawings.

SUMMARY OF THE INVENTION

The tool has a shank section disposed to be chucked at one end to the drive spindle of a drill press or the like, and has a cylindrical tool holder connected at one end by a shear pin to the shank to be driven thereby. The tool holder has a notch or recess in its opposite end in which a tool bit is secured at one end to a pivot pin for swinging movement thereby between an operative position in which the tool projects radially outwardly from the tool holder recess and in inoperative position within the recess. The pivot pin is connected at one end to an elongate operating rod which is mounted for limited rotation in opposite directions in an axially extending slot in the tool holder, so that when the rod is swung to one limit position the tool bit is swung to its operative position, and vice versa.

To operate the actuating rod an actuating disc is mounted to rotate at one side thereof against an annular shoulder formed on the tool holder intermediate the ends thereof. At its opposite side the disc is frictionally engaged adjacent its outer peripheral surface with one side of an annular friction pad which is urged resiliently against the disc by a flywheel. The flywheel is rotatably mounted on the tool holder to have one side thereof urged adjacent its outer periphery into frictional engagement with the opposite side of said friction pad, whereby rotation is transmitted by the shank section through the flywheel and friction pad to the actuating disc.

The actuating disc has on the side thereof confronting the flywheel two radially spaced pins, one of which engages a lateral projection on the operating rod to pivot it to its tool bit actuating position, when the actuating disc is rotated in one direction by the flywheel, and the other of which pins engages the projection on the operating rod to swing the rod to its tool bit retracting position, when the flywheel rotates the disc in the opposite direction. The friction coupling between the flywheel and actuating disc thus eliminates any undesirable shock loading of the actuating rod and tool bit.

THE DRAWINGS

FIG. 1 is an elevational view from a back spotfacing and counterboring tool made according to one embodiment of this invention, the retractable bit of the tool being shown in its extended or operative position, and portions of the tool being broken away and shown in sections;

FIG. 2 is a sectional view taken generally along the line 2—2 in FIG. 1 looking in the direction of the arrows;

FIG. 3 is a sectional view taken generally along the line 3—3 in FIG. 1 looking in the direction of the arrows;

DETAILED DESCRIPTION OF THE PREFERRED EMBODIMENTS

Figure 4:
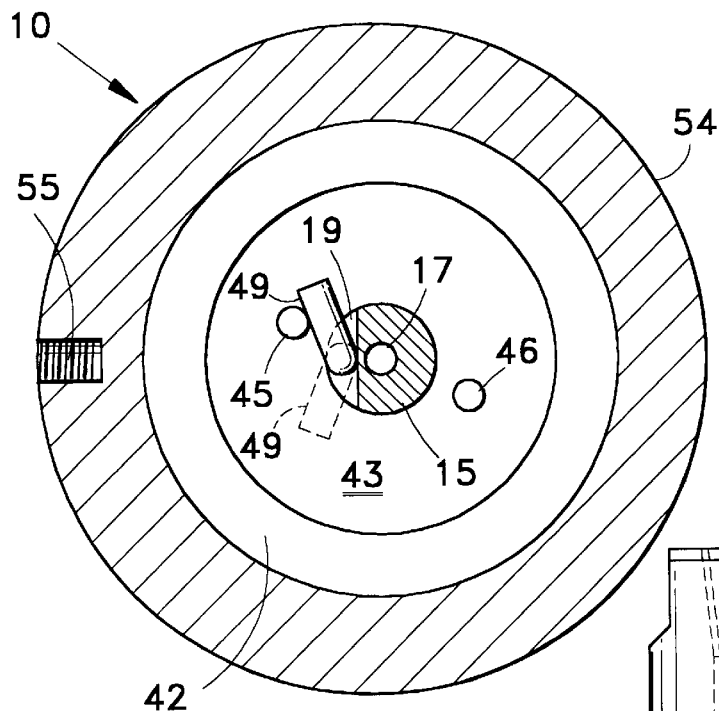
FIG. 4 is a sectional view taken generally along line 4—4 in FIG. 1 looking in the direction of the arrows.

Referring now to the drawings by numerals of reference, and first to the embodiment shown in FIGS. 1 to 4, 10 denotes generally a spotfacing/counterboring tool comprising an axially bored shank section 12 which is adapted to be secured at one end thereof (the upper end in FIG. 1) in a conventional manner in the chuck of a drill press, or the like, to be driven thereby rotatably and selectively in opposite directions about its axis. Extending coaxially into the lower end of the axial bore 13 in shank 12, and secured therein as noted hereinafter, is the reduced-diameter upper end 14 of a cylindrical tool bit holder or support 15. Holder 15 has a reduced-diameter lower end having formed therein a transversely extending bit accommodating notch or slot 16. Intermediate its ends the holder 15 has extending therethrough an elongate, axial bore 17, which opens at its upper end on the bore 13 in shank 12, and at its lower end on the upper end of the slot 16 that is formed on the lower end of holder 15. The holder 15 also has formed in its outer peripheral surface an axially extending slot or groove 18, which is generally U-shaped in cross section, as shown in FIG. 2, and which also opens at its upper end on the bore 13 just above the upper end of the bit accommodating notch 16. Intermediate its ends the holder 15 also has formed in the portion of its surface containing slot 18 a transversely extending slot or notch 19 (FIGS. 1 and 4) which extends at right angles across slot 18 intermediate its ends.

Adjacent its upper end holder 15 is secured in the bore 13 of shank 12 by a shear pin 21, which has an overall axial length approximately equal to the outer diameter of the shank 12. As shown in FIG. 2, pin 21 extends through registering, diametral openings 22 and 23 formed in the shank 12 and holder 15, respectively. Pin 21 is seated with a slip fit in the registering openings 22 and 23, and therefore is secured against axial movement in these openings by a shear pin retainer ring 25, which is seated in an annular groove 26 formed in the outer peripheral surface of shank 12 to register with opposite ends of the shank openings 22. As shown more clearly in FIG. 2, pin 21 has formed intermediate its ends two axially spaced, coaxially disposed annular recesses 28 that register intermediate their ends with the outer diameter of the holder 15, and with the inner diameter of bore 13 in the shank 12. In the event that any excess torque is imparted by shank 12 to the holder 15, the reduced-diameter sections formed in the pin 21 by the annular recesses 28 will shear to prevent any undesirable damage to the tool 10.

Mounted for swinging movement into and out of the notch or recess 16 in the lower end of the holder 15, and between inoperative and operative positions, respectively, is a tool bit 31 of conventional design. A pivot pin 32 (FIGS. 1 and 3) which extends upwardly and snugly through a bore 33 in the lower end of holder 15 and transversely across the slot 16, extends upwardly through a bore 34 in the inner end of the tool bit 31, and into the lower end of the slot 18 in the holder 15. A set screw 35, which threads into the tool bit 31 transversely of its bore 34, has its inner end seated on a flat 36 formed in the periphery of pivot pin 32 intermediate the ends thereof, thereby securing the pivot pin 32 in the lower end of the holder 15. In this position a diametral slot or groove 38, which is formed in the upper end of pin 32, registers coaxially with the slot 18 for purposes noted hereinafter.

Intermediate its ends, at the juncture with its reduced-diameter upper end 14, the holder 15 has formed thereon an external, annular shoulder 41. Rotatably mounted coaxially on the lower end of section 14 of the holder 15, and with the lower end thereof seated against the annular shoulder 41, is a circular actuating disc 42. Disc 42 has a plane, flat upper surface 43 which lies in a plane extending normal to the axis of the holder 15, and which registers with the lower end of the notch 19 formed in the holder 15. Projecting from the upper surface 43 of the disc 42 adjacent diametrally opposite sides of section 14 of the holder 15, are two, like, cylindrically-shaped actuating pins 45 and 46. As noted in greater detail hereinafter, pins 45 and 46 are designed to manipulate an elongate tool bit or cutter operating rod 47 (FIG. 1), which rotates with holder 15 in its slot 18, and which also is mounted for limited pivotal movement in the slot 18 in the holder 15. As shown more clearly in FIG. 1, rod 47 has at its lower end a diametral projection or rib 48, which is seated in the slot 38 in the upper end of the pivot pin 32. At its upper end rod 47 extends through the axial bore in the activator disc 42, and into the recess 19 at which point the rod 47 is bent at right angles to form thereon a short, right angular projection 49 (FIGS. 1 and 4) that extends radially outwardly beyond the outer peripheral surface of the holder 15, and into axial registry with the actuator pins 45 and 46. Projection 49 thus extends transversely across the path in which the pins 45 and 46 revolve when the disc 42 is rotated about the axis of holder 15, thereby operatively providing a lost motion connection between the disc 42 and holder 15 as noted hereinafter.

Seated coaxially upon a marginal portion of the upper surface 43 of disc 42 adjacent the outer peripheral edge thereof is an annular friction ring 51. Ring 51 is supported by the disc 42 in a counterbore 53 formed in the lower end of a circular flywheel 54, which is rotatably mounted on the holder 15 with the bottom of its counterbore 53 engaging ring 51 and overlying the upper ends of the actuator pins 45 and 46 in spaced relation thereto. The outer peripheral surface of disc 42 also extends part way into the counterbore 53 so that the flywheel 54 in effect overlies and encloses the friction ring 51 and the outer periphery of disc 42. Flywheel 54, which has in its outer peripheral surface an internally threaded radial recess 55 for a purpose noted hereinafter, is urged resiliently and axially downwardly against the friction ring 51 by a coiled compression spring 56, which is seated at its lower end against the upper surface of the flywheel 54, and at its upper end in a circular counterbore 57 formed in the lower end of the shank section 12.

The top and bottom sides of the friction ring 51 have thereon surfaces which are frictionally engaged with, respectively, the upper surface 43 of the disc 42 and the bottom of the counterbore 53 in the flywheel 54. As a result of the force with which spring 56 urges the flywheel 54 against the friction ring 51, the rotation of the shank section 12 is transmitted to the actuator disc 42 via the frictional coupling effected by the ring 51. Thus when the shank 12 and holder 15 are suddenly started, stopped or reversed, the flywheel 54, ring 51 and disc 42 can momentarily remain stationary, or can over rotate relative to the holder 15, thus causing the cutter bit 31 to be swung to and from its operative position. For example, sudden counterclockwise rotation of holder 15, as seen in FIG. 4, causes relative clockwise rotation of disc 42 with respect to holder 15 until the pin 45 strikes the projection 49 on the actuator rod 47, in effect providing a lost motion connection between disc 42 and holder 15. This rotates rod 47 clockwise in FIG. 4, and counterclockwise in FIG. 3, to effect corresponding pivotal movement of the pivot pin 32 and the attached tool bit 31, thus swinging the tool bit to its extended or operative position as shown in FIGS. 1 and 3. On the other hand, when the rotation of the shaft 12 is suddenly reversed, the flywheel 54 and the associated friction ring 51 momentarily effect rotation of the disc 42 relative to holder 15 in the opposite direction, or clockwise in FIG. 3 and counterclockwise in FIG. 4, thereby causing the other pin 46 on disc 42 to be rotated into engagement with the projection 49 on rod 47, thus swinging projection 49 into its broken line position as shown in FIG. 4, and simultaneously swinging the tool bit 31 into its retracted or inoperative position as shown in phantom by broken lines in FIG. 3.

The advantage of this construction is that when the shank 12 is rotated, the flywheel 54 and associated friction ring 51 eventually cause corresponding rotation of the actuator disc 42, but without imparting any unnecessary shock loading or overloading of the pivotal movement of the actuating rod 47 and pivot pin 32. Whenever an actuator pin 45 or 46 is rotated and strikes the projection 49 on rod 47, the weight of the flywheel 54 may cause the wheel 54 to continue to rotate in a given direction, but when the rod 47 has been swung to one or the other of its limit positions, the friction ring 51 is free to slip relative to the actuating disc 42 during continued rotation of the flywheel 54, thus absorbing any undesirable shock loading. In practice, of course, the compressive force exerted by the spring 56 can be adjusted or preset to provide the desired maximum force which will be applied by one of the pins 45 or 46 to the rod 47 via its projection 49.

Figure 5:
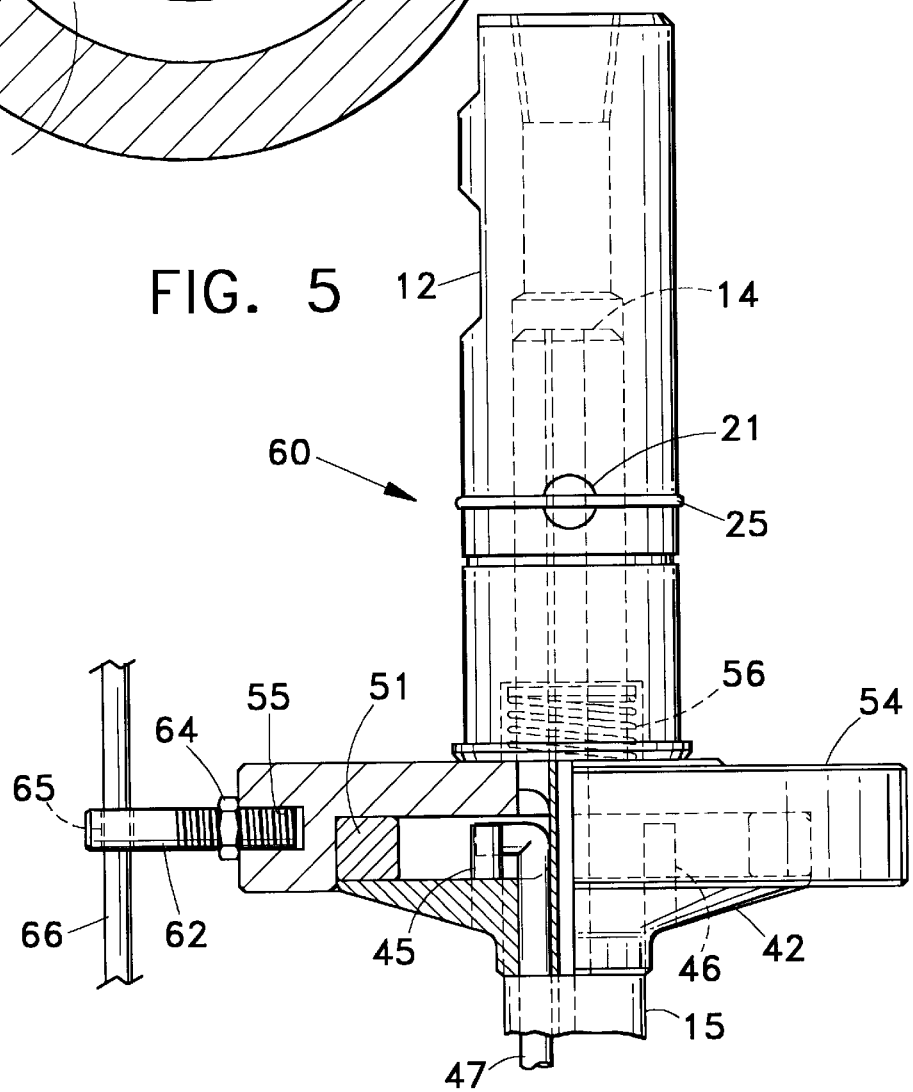
FIG. 5 is a fragmentary elevational view generally similar to FIG. 1, but showing a modified form of this back spotfacing and counterboring tool.

Referring now to the embodiment shown in FIG. 5, wherein like numerals are employed to denote elements similar to those employed in the first embodiment, 60 denotes generally a modified tool which is similar to that disclosed in the first embodiment except that a torque rod or bar 62 has an externally threaded portion on one end thereof which is threaded into the recess 55 in the flywheel 54, and is secured against undesirable rotation relative to the flywheel by a lock nut 64. Adjacent its opposite, outer end bar 62 has therethrough a circular opening 65 for slidably accommodating a rod 66, which is secured to a non-rotating part of the associated machine tool frame (not illustrated) to extend parallel to the axis of tool 60. The torque bar 62 is slidable relative to the rod 66, thereby permitting tool 60 to be shifted vertically relative to rod 66 and the work which is to be machined, while at the same time the rod 66 prevents rotation of the flywheel 54 with the tool shank 12.

In this embodiment the spring-loaded flywheel 54 and the associated friction ring 51 do not rotate, but the actuating ring 42 is rotated relative to the friction ring 51 via holder 15 and rod 47. For example, as shown in FIG. 5, spring 56 urges the flywheel 54 and hence the friction ring 51 axially against the actuator disc 42, so that ring 51 thus tends frictionally to retain disc 42 against any rotation about the axis of tool 60. However, when the shank 12 and its holder 15 are driven, for example clockwise about their axis as shown in FIG. 4, projection 49 on the actuator rod 47 is already in one limit position in the notch 19, so that the counterclockwise rotation of holder 15 is imparted to rod 47 and its projection 49. The action of the friction 51 ring against the disc 42 therefore causes the pin 45 to remain engaged with the projection 49, which thereby imparts counterclockwise rotation to the disc 42 about the tool axis via pin 45.

However, when the rotation of the shank 12 and its holder 15 is reversed, for example causing the holder 15 to rotate clockwise about its axis in FIG. 4, rod 47 and its projection 49 will be rotated relative to disc 42, until such time that projection 49 is engaged with the pin 46 on disc 42, thus causing rod 47 to be pivoted in a direction to retract the tool bit 31 into the recess 16 in the holder 15, after which continued rotation of the holder 15 in the clockwise direction will cause projection 49, now engaged with the pin 46, to impart clockwise rotation to the disc 42. Thus, simply by reversing the direction of the rotation of shank 12 and its holder 15, the tool bit 31 will be pivoted between its operative and inoperative positions.

By way of example, the friction ring 51 may be made from a bearing bronze, which provides a long-wearing frictional contact between the flywheel 54 and disc 42 as shown in the first embodiment, and as between the ring 51 and the disc 42 as shown in the second embodiment. Moreover, while this invention has been illustrated and described in detail in connection with only certain embodiments thereof, it will be apparent to one skilled in the art that it is capable of still further modification, and that this application is intended to cover any such modifications as may fall within the scope of one skilled in the art or the appended claims.

I claim:
1. A tool, comprising a cylindrical holder having on one end thereof a shank section disposed to be attached to a machine tool spindle operable to effect rotation of said holder selectively in opposite directions about its axis, a cutter mounted on said holder adjacent the opposite end thereof for movement between an inoperative position within a recess in said holder, and an operative position in which the cutter projects laterally from said holder to an operative, cutting position, a cutter activating member mounted on said holder for rotation therewith, and for limited movement relative thereto between first and second limit positions, respectively, means connecting said cutter to said activating member for movement thereby between said operative and inoperative positions thereof upon movement of said member between its first and second limit positions, and means mounting an intertial member on said holder for rotation therewith, and for limited movement relative thereto upon change in the direction of rotation of said holder, said mounting means including means frictionally coupling said activating member to said inertial member for movement therewith and operative to effect movement of said activating member from one to the other of said limit positions thereof upon movement of said inertial member relative to said holder.

2. A tool as defined in claim 1, wherein said inertial member comprises a flywheel rotatably mounted on said holder coaxially thereof, said activating member is mounted on said holder for limited rotation relative thereto and coaxially thereof upon reversal of the rotation of said holder, and said means frictionally coupling said inertial member to said activating member comprises a friction element interposed between said flywheel and said activating member and operative normally to impart the rotation of said activating member and holder to said flywheel, and to impart the rotation of said flywheel to said activating member upon reversal of the rotation of said holder.

3. A tool as defined in claim 2, wherein during movement of said activating member from one to the other of its limit positions said activating member rotates in a direction opposite to that of said holder.

4. A tool as defined in claim 2, wherein said flywheel is operative upon reversal of the rotation of said holder momentarily to rotate in a direction opposite to the direction of rotation of said holder.

5. A tool as defined in claim 1, wherein said means connecting said cutter to said activating member comprises, a rod mounted on said holder adjacent said opposite end thereof for pivotal movement about an axis parallel to the axis of said holder, said rod being connected at one end thereof to said cutter to impart the pivotal movement of said rod to said cutter, and lost motion means connecting the opposite end of said rod to said activating member and operative upon movement of said activating member from one to the other of its limit positions to swing said rod from one to the other of its limit positions.

6. A tool as defined in claim 5, wherein said lost motion means comprises
   a pair of spaced operating surfaces formed on said activating member, and
   a projection formed on said rod adjacent said opposite end thereof and extending into a space between said operating surfaces on said activating member,
   one of said surfaces on said activating member being engagable with said projection on said rod to pivot said rod to one limit position thereof when said activating member moves to one of its limit positions, and the other of said surfaces being engagable with said projection to pivot said rod to its other limit position when said activating member moves to its other limit position.

7. A tool as defined in claim 1, including a shear pin interposed between and operatively connecting said shank section to said one end of said holder.

8. A tool, comprising
   a cylindrical holder having on one end thereof a shank section disposed to be attached to a machine tool spindle operable to effect rotation to said holder selectively in opposite directions about its axis,
   a cutter mounted on said holder adjacent the opposite end thereof for movement between an inoperative postion within a recess in said holder, and an operative position in which the cutter projects laterally from said holder to an operative cutting position,
   a flywheel rotatably mounted on said holder coaxially thereof, and
   means connecting said flywheel to said holder normally to transmit the rotation of said holder to said flywheel, and operative upon sudden change in the rotation of said holder from one direction to the other, to permit said flywheel momentarily to continue to rotate in said one direction relative to said holder, and
   said connecting means including activating means operative upon momentary rotation of said flywheel relative to said holder, to move said cutter from one to the other of its operative and inoperative positions, respectively.

9. A tool as defined in claim 8, wherein said activating means comprises,
   a pair of members mounted on said holder for rotation therewith, and respectively for limited rotation relative thereto between first and second limit positions,
   one of said members being frictionally coupled to said flywheel normally to impart thereto the rotation of both said holder and the one of said memebers, and operative to be rotated by said flywheel relative to said holder, and from one to the other of its limit positions, upon said momentary rotation of said flywheel relative to said holder,
   the other of said members being connected to said cutter and being operative upon movement from one to the other of the two limit positions thereof to move said cutter between its operative and inoperative positions, respectively, and
   lost motion means connecting the one of said members to said other member normally to impart the rotation of said holder to the one of said members via said other member, and operative upon sudden reversal of the rotation of said holder momentarily to interrupt the rotation of the one of said members by said holder.

10. A tool as defined in claim 8, wherein said activating means comprises,
    a pair of members mounted on said holder for rotation therewith, and respectively for limited rotation relative thereto between first and second limit positions,
    a pair of spaced operating surfaces formed on one of said members, and a projection formed on the other of said members and extending into the space between said operating surfaces,
    said other of said members being connected to said cutter and being operative upon movement from one to the other of the two limit positions thereof to move said cutter between its operative and inoperative positions, respectively, and
    moving means operative upon rotation of said flywheel in one direction relative to said holder to cause engagement of said projection with one of said operating surfaces to effect movement of said other member to one of said limit positions thereof, and vice versa.

11. A tool as defined in claim 10, wherein said moving means comprises friction means coupling said one member to said flywheel for rotation therewith.

12. A tool as defined in claim 11, including
    a fitting secured to said flywheel and projecting at one end thereof beyond the outer surface of said flywheel, and
    means for releasably securing said one end of said fitting to a stationary object selectively to secure said flywheel against rotation by said holder.

* * * * *